April 7, 1959  T. H. BURTON  2,880,622
DRIVING UNITS FOR ROTARY MEMBERS
Filed Oct. 27, 1953

INVENTOR
Thomas Howard Burton.

BY Richardson, David and Nordon
his ATTORNEYS

United States Patent Office 2,880,622
Patented Apr. 7, 1959

2,880,622

DRIVING UNITS FOR ROTARY MEMBERS

Thomas Howard Burton, Sheldon, Birmingham, England, assignor to Hordern, Mason and Edwards Limited, Birmingham, England, a British company Application October 27, 1953, Serial No. 388,571

Claims priority, application Great Britain October 27, 1952

5 Claims. (Cl. 74—157)

The present invention relates to a driving unit for shafts, spindles or other members which require to be rotated selectively in one direction of rotation or the other continuously or in a series of increments or rotational steps.

The invention is of general application for any rotary member required to be operated in this manner but one specific field to which it may advantageously be applied is to the rotation of screwed tool adjusting spindles of pressors or the like machine tools embodying a reciprocating slide or ram.

In machine tools of this general type, the reciprocating tool carrying part hereinafter referred to for convenience only and not in any limiting sense as the ram, is usually connected to a cam crank or eccentric, through the intermediary of a screwed spindle which when rotated relatively to nut means embodied in or associated with the ram or crosshead causes the initial or datum position of the ram to be adjusted relatively to the bed or work-table of the machine thus varying the "daylight" between the movable and stationary die parts or tools.

One object of the present invention is to provide a driving unit of new or improved construction especially but not exclusively to meet the general requirements involved in adjusting such screwed shafts or equivalent rotary members.

A further object of the invention is to provide a driving unit embodying simple and reliable means for selecting the direction in which drive is to be effected.

A further object is to provide in such a driving unit, and particularly in applications to power presses, means for automatically releasing and locking the controlling or actuating elements of the unit with the output or driving member to prevent drift of the unit when installed but not in actual use.

Yet another object is to provide a compact construction capable of being applied without inconvenience in diverse applications where space is limited by considerations such as the proximity of other parts of the apparatus to which the driving unit is applied.

Still another object is to provide in a driving unit means for automatically increasing the strength or pressure of the driving engagement between co-operative components which are required to be alternatively maintained in driving engagement and released or established in slipping relation according to the direction of drive required and the direction of imput motion to such unit.

Broadly, a driving unit in accordance with the invention comprises a rotary driving member adapted to be fixed to the spindle or other member to be rotated, said driving member having a toothed or similarly indented face which coacts a pawl system supported on an oscillatable carrier, the pawl assembly having two sockets or formations by means of which a tommy bar or other hand tool may be engaged therewith to impart an oscillatory driving torque thereto, these sockets or formations being so positioned in relation to the part or parts of the pawl assembly which engage with the toothed or indented face of the driving member to rotate same, that the application of said torque to one of them automatically sets up a condition in the pawl assembly causing same to drive in one direction of rotation and slip in the other direction of rotation, and alternative application of said torque to the other socket or formation automatically reverses both the direction of drive and slip, whereby selection as to the direction of drive is effected by choice of a particular socket or formation.

The invention will be described with reference to the accompanying drawings illustrating by way of example a preferred embodiment of same and wherein.

Figure 1:
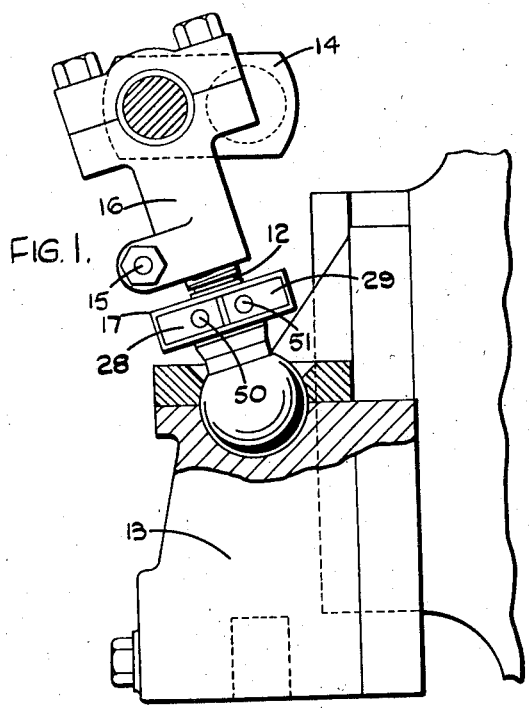
Figure 1 is a fragmentary view in side elevation showing one construction of driving unit in accordance with the present invention applied to the driving of a screwed spindle on a power press for adjusting the initial vertical position of the ram of this press in relation to a given position of the driving crank.
Figure 2:
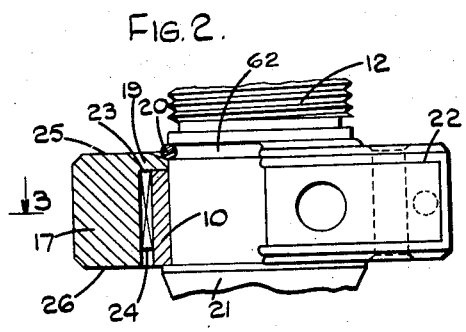
Figure 2 is a part sectional view on an enlarged scale showing constructional details of the driving unit.
Figure 4:
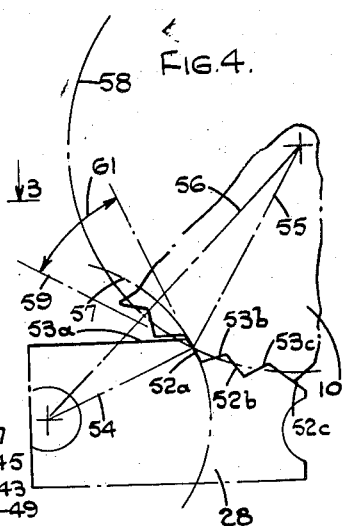
Figure 3:
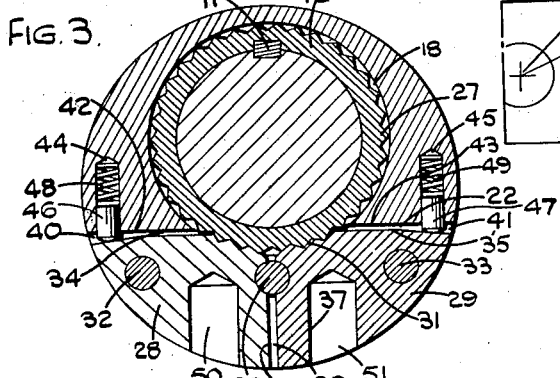

Figure 3 is a view of the driving unit in plan and in cross section on the line 3—3 of Figure 2, and Figure 4 is a diagrammatic view of part of the construction as shown in Figure 3 illustrating especially the angular relationship existing between the driving face of the pawl teeth nearest the pawl pivot with radii drawn to this face from the pivotal axis of the pawl and the centre of the driving ring.

The construction of driving unit illustrated is intended primarily to be applied to a power press for adjusting the initial or datum position of the ram above the bed of the press. The driving unit comprises a driving member in the form of a ring 10 adapted suitably such as by the provision of a key 11 to be fixed to the screwed spindle 12 by which the ram or tool carrying member 13 of the press is connected to the crank or equivalent driving device 14 for imparting reciprocating motion thereto. It will be understood that adjustment of the initial or datum position of the tool carrying member is normally effected by rotating this screwed spindle 12 relatively to the ram, after slackening the clamping bolt 15 of the sleeve 16 and that the direction of rotation consequently determines whether the adjustment is performed in an upward or downward direction.

For the purpose of enabling such rotary movement to be imparted to the ring there is mounted in association therewith, an operating assembly comprising an oscillatory carrier 17, the axis of oscillation of which is coincident with that of the ring.

This carrier 17 may be in the form of a circular disk or block of metal in which is formed an eccentrically positioned cylindrical bore 18 in which is disposed the driving ring 10, this bore having at its upper end an inwardly directed flange 19 upon which the upper face of the ring is seated. When the driving unit is installed on the screwed spindle 12 of a power press, any suitable form of retaining device is provided to prevent relative axial displacement between the carrier and the driving ring; for example, a circlip 20 may be provided at this position which is engaged in a grove 62 at the upper end of the driving ring. Beneath the driving unit the spindle 12 has a collar or shoulder 21 upon which the lower face of the ring rests.

A further part of the operating assembly comprising a pawl assembly is mounted in the carrier and for this purpose a slot or recess 22 is milled or otherwise cut therein, this slot or recess opening into a portion of the circumferential face of the carrier and its upper and lower internal walls 23, 24 being parallel to but spaced inwardly from the respective upper and lower end faces 25, 26 of the carrier so that the whole slot or recess as viewed in plan is in the form of a segment of a circle, but less than a semi-circle. The depth of this slot measured in a radial direction along the perpendicular bisector of the chord which forms the inner vertical wall of the slot, is such that the slot communicates with the eccentrically disposed cylindrical bore in which the driving ring is mounted and consequently the peripheral face of the driving ring projects somewhat into the inner portion of the slot so as to present an arcuate face within the slot as can be seen clearly in Figure 3.

The driving ring has its periphery formed with teeth or indentations 27 of any convenient form preferably triangular as viewed in cross section i.e. in the direction of the axis of the ring, the triangles being isosceles in form with their apexes directed radially outwards in relation to the centre of the ring.

Co-acting with the arcuate face of the driving ring which lies in the interior of the slot and which of course presents teeth or indentations, are a pair of pawl elements 28, 29 each pivotally supported within the slot and preferably of the same thickness as the slot so that their upper and lower faces lie against or closely adjacent to the upper and lower internal walls of the slot.

Collectively the two pawl elements occupy substantially the whole of the slot and they are separated from each other by a gap 30 lying in a radial plane parallel to the axis of the driving ring and passing through the midpoint of the arcuate portion of the ring 10 which lies within the slot 22.

Each pawl element as viewed in Figure 3 is thus of arcuate or part-annular form, although of relatively short length and its inner arcuate face is formed with teeth or indentations 31 of complementary form to those presented by the ring so as to be capable of engaging or interfitting therewith.

The pawl elements may be pivotally mounted on the carrier by means of pivot pins 32, 33 positioned near the outer extremity of each pawl element i.e. nearest the ends 34, 35 of each element remote from each other and also nearer the outer circumference rather than the inner circumference of each pawl element.

The inner or adjacent end faces 36, 37 are separated by the gap 30 which is sufficient width to permit individual pivoting or rocking movement of the pawl elements in opposite rotational senses about their pivots and of sufficient magnitude to enable each to be withdrawn from engagement with the ring or at any rate to slip ratchetwise in relation to the ring in one direction of rotation of the carrier.

Such rocking movements of the pawls are however co-related with each other by means of a cylindrical thrust block 39 arranged with its axis parallel to that of the pivot pins of the pawls and slightly offset in the radial outward direction from the line joining these axes and situated midway between them, this thrust block being received in part-circular opposed seatings formed near the inner end of respective adjacent end faces of the pawls.

Instead of providing a cylindrical thrust block or other structurally separate part for connecting the pawl elements so that their rocking movements may be correlated with each other, it would of course be possible to form one of the pawl elements with a projecting knuckle member and the other pawl element with a seating or recess in which said knuckle member engages, or to form the end faces of the pawls as parts of circles and cut gear teeth thereon.

Consequently, when either pawl is rocked in one direction about its pivot pin, the other pawl will be rocked in the opposite direction, such motion being transmitted by the thrust block.

To permit such motion to take place the outer ends 34, 35 of each pawl are separated from the walls opposed 42, 43 of the carrier by an appropriate gap which is preferably divergent with respect to this wall, near the outer region of the wall as indicated at 40, 41.

The walls 42, 43 of the slot are provided recesses or bores 44, 45 extending into the body of the carrier perpendicularly to said wall and which serve to accommodate respective spring-loaded plungers 46, 47 acting on the two pawls and tending to rock them towards each other about their pivot pins and into engagement with the toothed arcuate face of the driving ring, so that both pawls are normally so engaged and the carrier is effectively locked or retained relatively to the driving ring.

It will be understood that it is not essential to provide two springs 48, 49 since the rocking movements of the pawls are co-related to each other and that a single spring will be sufficient to maintain the required engagement.

The screwed spindle 12 of the press is normally prevented from rotating when the press is in operation by the clamping sleeve 16. Consequently the locking or retaining of the carrier from drifting around during the operation of the press, so that the possibility that it may foul part of the press frame or structure adjacent to the screwed spindle is entirely obviated, and, furthermore, there is no possibility that when the press is stopped the pawls will be found to be inaccessible by virtue of such driving of the carrier.

For transmitting oscillatory movement to the carrier for rotating the driving ring intermittently in one or the other direction, a pair of sockets 50, 51 or like recessed formations are provided in equivalent positions in respective pawl elements.

These sockets may conveniently be circular in cross section for the reception of a tommy bar and are positioned intermediate the pivot pins 32, 33 of the pawls and the inner end faces 36, 37 thereof, the centre-line or axis of the socket extending inwardly towards the centre of the ring at any convenient angle, for example, parallel to the inner end faces 36, 37 of the pawl.

The relative positioning of these pivotal axes, the form of the teeth or indentations, and the positioning on each pawl element of the sockets or other formations, by means of which an oscillatory torque may be applied to the carrier are of importance and details therefore as to one set of dimensions which produces the required result are hereinafter given by way of example. It will, of course, be understood that these precise dimensions are not limiting and that considerable departures may be made within the scope of the invention provided that the general principles of operation of the device which will be apparent from the subsequent description are not violated.

The approximate dimensions of the ring, the carrier, and the pawl elements, found to produce at least one satisfactory combination in practice are as follows. External diameter of the ring 3½"; internal diameter 2¾" (or any value appropriate to the diameter of the shaft to be driven); diameter of the carrier 5¾"; separation between the centres of the carrier and the cylindrical recess accommodating the driving ring ¾"; separation of the pivotal axes of the pawl elements 4"; distance of these axes from the inner wall of the slot 9/16"; distance of the centrelines or axes of the sockets from the pivotal axis of each pawl element 1⅛"; the axes or centrelines of these sockets being parallel to the adjacent inner end faces 36, 37 of the pawls.

Referring now particularly to Figure 4 of the drawings this illustrates the angular relationship which exists between the driving face of that tooth of one of the pawl elements which lies nearest to the pivot of the pawl element and radii drawn to the centre point of this face from the pawl pivot and the centre of the driving ring 10.

For the sake of convenience only the pawl element 28 has been illustrated and the driving faces of the teeth of this pawl element are indicated at 52a, 52b, 52c while the slipping or ratcheting faces of the pawl teeth are indicated at 53a, 53b, and 53c.

Radii indicated by the chain lines 54 and 58 have been drawn to the centre point of the driving face 52a from the pivotal axis of the pawl elements 28 and from the centre of the driving ring 10 respectively, this axis and centre being joined by a further chain dotted line 56. Additionally pitch circles indicated by chain dotted lines 57 and 58 centered on the pivotal axis of the pawl element 28 and on the centre of the driving ring 10 respectively have also been drawn through the centre point of the driving face 52a as have also tangents 59 and 60.

If the driving ring and the pawl carrier as a whole are subjected to any external torque tending to rotate the driving ring relatively in a clockwise direction as seen in Figure 4, or the pawl carrier in an anti-clockwise direction as seen in Figure 4, the part of the pawl element 28 through which the radius 54 is drawn and the part of the driving ring 10 through which the radius 55 is will tend to act toggle-wise owing to the relative inclination of these radii causing the driving face 52a of the pawl element to become pressed more strongly against the opposed face of the associated tooth on the driving ring.

Consequently the security of the locking against relative rotation between the pawl carrier and the driving ring increased automatically with the torque tending to produce such relative rotation in the direction above referred to, and reliance is not therefore placed wholly upon the strength of the associated pawl spring 48 which merely provides or ensures initial meshing of the pawl teeth with those of the driving ring.

It will be appreciated, however, that when relative rotation between the pawl carrier and the locking ring is required to be performed in the opposite direction the pawl carrier then being rotated clockwise as viewed in Figure 4 it is necessary that the driving face 52a should be disengaged from the opposed face of the associated teeth on the locking ring.

To permit of this disengagement whilst still retaining the property of automatically increasing tightening by the toggle-action previously referred to, the angular disposition of the driving face 52a must be such that it lies in a region defined by the tangent 50 drawn to the pitch circle 57 and the tangent 59 drawn to the pitch circle 58.

Ideally the driving face 52a lies in the tangential plane containing the tangent 60 since this produces the most effective toggle-action whilst still permitting disengagement, but the satisfactory results can be attained when the plane of the driving face lies anywhere in the angle indicated by the arrow 61 it being appreciated that the tangential plane 59 is an extreme limiting case.

The driving faces 52b and 52c in the construction illustrated will in effect lie in between the two corresponding tangents which can be drawn at the centre point of these faces to corresponding pitch circles passing therethrough and consequently for the purposes of ensuring disengagement it is the driving face 52a which is the operative factor.

When it is required to impart intermittent uni-directional rotations to the driving ring, a tommy-bar or similar tool is inserted in one of the sockets 50, 51 and the required torque applied to the driving unit as a whole. Torque applied in one rotational sense to the tommy bar will tend to rock the associated pawl element out of engagement with the teeth of the driving ring or if disengagement does not actually take place to the extent of complete separation, there will be a slipping ratchet-wise of the pawl over these teeth as the carrier rotates. Such rocking and movement will take place when the torque is applied from the tommy-bar towards the pivot pin of the particular pawl element concerned i.e. in a clockwise direction for pawl element 28 and an anti-clockwise direction for pawl element 29. Concurrently, this rocking movement transmitted through the cylindrical thrust block between the pawl elements will cause a like but opposite rocking movement to be imparted to the other pawl element and this likewise will be disengaged or will slip ratchet-wise in relation to the other of the locking rings.

When, however, torque is applied to the tommy-bar in a direction away from the pivot pin of the associated pawl element, the latter will be pressed more strongly into engagement with the teeth of the locking ring and a like pressure will be applied to the driving ring by the other pawl element through the operation of the cylindrical thrust block.

Intermittent uni-directional rotation of the driving ring in one direction or the other direction will be selected by inserting the tommy-bar or like tool in the socket 50 or socket 51 according to the direction of rotation required.

The driving unit need not, and preferably does not present any externally projecting parts, and consequently the reciprocation in an axial direction of the entire unit in correspondence with the reciprocation of the screwed ram spindle 12 is not likely to result in the fouling of any fixed parts of the press structure or frame by projecting parts or controls since these latter can be eliminated from the driving unit.

A particular advantage of the unit is that the working parts do not need to occupy a large space measured in the axial direction, for example, the overall dimensions of the unit in this direction including the carrier may be of the order of 1¾" when the working parts of the unit have the dimensions previously specified. In power presses, this represents an absolute gain in the possible extent of ram movement for a given height of the crankshaft above the bed or work-table of the press.

Although the invention has been specifically described with reference to its application to a power press it is contemplated that the invention may be applied generally to other mechanisms, for example the screwed spindles of lifting jacks or the screwed spindles constituting extensible legs or supporting members of apparatus and machines which are required to be adjusted until they are accurately level.

What I claim then is:

1. A driving unit comprising a rotary driving member adapted for connection with the member to be driven, said driving member having a toothed face, an oscillatable carrier, two pawl elements each pivotally mounted on said carrier, biasing means urging a part of each pawl element into coaction with the toothed face of said driving member, said pawl elements having respective tool receiving formations adapted to receive releasably a hand tool for imparting an oscillatory driving torque to the pawl elements, these formations being positioned relatively to the pivotal axes of respective pawl elements and relatively to said coacting parts to produce in response to the application of driving torque in one direction, a driving engagement between said parts, and to produce in response to the application of driving torque in the other direction a slipping relation between said parts, the direction of drive and slip being opposite for respective pawl elements, and means operatively connecting said pawl elements together to transmit pivotal displacement from either of said elements to the other of said elements in a direction such that, said coacting parts of both of said elements are established simultaneously either in driving engagement or slipping relation with said driving member whichever formation is selected for reception of the hand tool.

2. A driving unit comprising a rotary driving member adapted for connection with the member to be driven, said driving member having a toothed face, an oscillatable carrier, two pawl elements each pivotally mounted on the carrier about axes parallel to that of the driving member at positions spaced angularly with reference to this axis, said pawl elements being situated adjacent to each other, means operatively connecting said pawl elements together comprising an articulated joint structure operatively interposed between adjacent parts of said pawl elements to provide correlated angular displacements of said pawl elements in opposite rotational directions about their respective pivotal axes, biasing means urging a part of each of said pawl elements into coaction with the toothed face of said driving member, and said pawl elements having respective tool receiving formations adapted to receive releasably a hand tool for imparting an oscillatory driving torque, these formations being positioned relatively to the pivotal axes of respective pawl elements and relatively to said coacting parts to produce in response to the application of driving torque in one direction, a driving engagement between said parts, and to produce in response to the application of driving torque in the other direction, a slipping relation between said parts, the direction of drive and slip being opposite for respective pawl elements whereby selection as to the direction of drive of the driving member is afforded by selection of one or the other of said formations for reception of said tool.

3. A driving unit comprising a rotary driving member adapted for connection with the member to be driven, said driving member having a toothed face, a carrier oscillatable substantially concentrically with said driving member, two pawl elements each pivotally mounted on said carrier and each having a part coacting with the toothed face of said driving member at a position offset from but close to a line joining the pivotal axis of the pawl element concerned with the centre of rotation of the driving member, said parts of the pawl elements having each at least one driving face lying in a plane substantially perpendicular to a radius drawn to said face from the pivotal axis of the pawl element rendering said driving face freely disengageable from the toothed face of the driving member by pivotal movement of the pawl element in one direction and tightening toggle-wise with the toothed face by pivotal movement in the opposite direction, means operatively connecting said pawl elements whereby pivotal displacement of either of said elements in said one direction produces like displacement of the other of said elements, and biasing means urging said driving faces of said pawl elements into contact with said toothed face of the driving member, said pawl elements having respective tool receiving formations adapted to receive releasably a hand tool for imparting an oscillatory driving torque to said pawl element in one direction to cause tightening of said driving face against the toothed face of said driving member to rotate same, and in the other direction to cause toggle-wise slipping of said driving face relatively to the toothed face of said driving member, the direction of drive and slip being opposite for respective pawl elements whereby selection as to the direction of drive of the driving member is afforded by selection of one or the other of said formations for reception of said tool.

4. A driving unit comprising a substantially cylindrical block-like body having a bore extending therethrough, for the passage of a spindle-like member to be driven, a driving ring accommodated in said bore and having peripheral teeth, the internal wall of said bore having an opening through which a segmental portion of less than 180° of said ring projects said body further having an open-sided housing extending about said projecting portion of said ring and defined by end walls spaced apart longitudinally of the axis of said bore at opposite ends of the body, two segmental pawl elements each occupying approximately half of this housing and each pivotally mounted between said walls about axes parallel to that of said ring and disposed at positions spaced apart at opposite sides of said housing, biasing means urging a part of each of said pawl elements into mesh with the teeth of the projecting segmental portion of said ring to retain said body against rotation relatively thereto, and said pawl elements having respective tool receiving formations adapted to receive releasably a hand tool for imparting an oscillatory driving torque to the pawl element concerned, to produce in response to the application of driving torque in one direction a driving engagement between the teeth of the ring and the meshing part of said pawl element and to produce in response to the application of driving torque in the other direction a slipping relation between said teeth and said part, the direction of drive and slip being opposite for respective pawl elements, and means operatively connecting said pawl elements together to establish said meshing parts of the pawl element and said ring teeth simultaneously in slipping relation when this condition obtains for either pawl element.

5. A driving unit comprising a rotary driving member adapted for connection with the member to be driven, said driving member having a toothed face, an operating assembly including oscillatable carrier, two pawl elements movably mounted on the carrier, biasing means urging both of the pawl elements into coaction with the toothed face of the driving member to retain the operating assembly against drift relatively to the driving member, driving tool receiving means on the carrier including spaced selectively usable tool receiving formations operatively associated with the pawl elements respectively to maintain same respectively in coaction with the toothed face of the driving member and transmit driving torque to the driving member through the intermediary of the pawl elements in opposite directions determined by which particular one of the formations is selected for use, and means operatively connecting the pawl elements with each other to displace both into an inactive position wherein they have slipping relation with the driving member when either of the pawl elements is so displaced during application of oscillatory torque thereto from its associated tool receiving formation, so that the pawl element associated operatively with the tool receiving formation not for the time being selected for use does not obstruct return or ratchetting movement of the carrier during application of the oscillatory torque.

References Cited in the file of this patent

UNITED STATES PATENTS

| | | |
|---|---|---|
| 291,791 | Slattery | Jan. 8, 1884 |
| 475,014 | Hinckley | May 17, 1892 |
| 844,356 | Hegerhorst | Feb. 19, 1907 |
| 980,626 | Gartze | Jan. 3, 1911 |
| 1,181,932 | Slonecker | May 2, 1916 |
| 1,368,394 | Guthrie | Feb. 15, 1921 |
| 1,372,308 | Derby | Mar. 29, 1921 |
| 1,397,308 | Ziska | Nov. 15, 1921 |
| 2,202,402 | Rueb | May 28, 1940 |
| 2,507,681 | Sage | May 16, 1950 |

FOREIGN PATENTS

| | | |
|---|---|---|
| 727,201 | France | Mar. 21, 1932 |